United States Patent Office 3,414,477
Patented Dec. 3, 1968

3,414,477
BIOSYNTHESIS OF PROTEIN FROM HYDRO-
CARBONS USING AN ANTIBIOTIC
John D. Douros, Millington, Lars A. Naslund, Roselle
Park, and Carleton J. McCoy, Union, N.J., assignors
to Esso Research and Engineering Company, a corporation of Delaware
No Drawing. Filed Apr. 25, 1966, Ser. No. 544,844
4 Claims. (Cl. 195—28)

ABSTRACT OF THE DISCLOSURE

In a bacterial fermentation process for the preparation of a high protein-content product utilizing a $C_1$–$C_{35}$ hydrocarbon feed, the process wherein the improvement comprises increasing the concentration of essential amino acids in nutritionally balanced proportions by the incorporation of streptomycin in the hydrocarbon medium.

This invention relates to an improved method for biosynthetically cultivating microorganisms on inexpensive hydrocarbon feeds in a fermenter and recovering directly an excellent high protein food supplement for animals and humans. In particular, this invention relates to a method for both increasing the microorganism growth rate and the hydrocarbon conversion rate of said cultivation process which comprises using varying concentrations of antibiotics in order to change the amino acid profile of a microorganism in order to make it a better and more balanced protein, particularly with respect to the amino acid profile.

The present world shortage of protein, especially low cost animal proteins for consumption by animals and humans is well known. In an attempt to alleviate this protein shortage, there have recently been developed several biosynthesis procedures whereby biologically produced protein can be provided by the growth of microorganisms on various carbon-containing substrate materials. One such technique involves growing various microorganisms (yeast and bacteria) on carbohydrate substrates. However, this technique usually requires expensive vitamins and other growth stimulating mediums in order to ensure the desired growth. In addition, the cost of the carbohydrate feed stock adds significantly to the cost of the process.

Another recent and even more promising technique for biologically synthesizing food protein is cultivating microorganisms on petroleum substrates. This latter type of protein synthesis is usually conducted in an aqueous biosynthesis bath containing a hydrocarbon feed, an inoculant of the microorganism to be grown, an aqueous growth medium, oxygen and other indispensable nutrients. This technique allows the use of hydrocarbon feeds, which are less expensive than carbohydrates, and does not usually require expensive growth factors such as vitamins, amino acids, etc., in order to insure proper microorganism cell growth.

Thus, in accordance with the present invention, in a fermentation process wherein carbon, nitrogen and oxygen are utilized and wherein a microorganism is used as the biological catalyst, an unexpected improvement is secured when using an antibiotic in the cultural medium.

Other stimulants and the like may be used in conjunction with the biological catalyst whereby an improved protein quality is secured. By doing this one can make an organism which grows rapidly but is a poor protein into one which is a high quality protein.

It is known in the art to use various biological catalysts in fermentation processes. Thus, the biosynthetic processing of the present invention is applicable to the biosynthesis of all microorganisms, including bacteria and yeasts, capable of growth on $C_{10}$–$C_{30}$ hydrocarbon feeds. While the present invention is applicable to a broad scope of operable microorganisms, there are nine microorganisms which are especially suitable for hydrocarbon assimilation. These microorganisms are tabulated hereinbelow along with their corresponding A.T.C.C. registration numbers, which were secured by depositing samples with the American Type Culture Collection in Washington, D.C.

| Microorganism name | A.T.C.C. number |
|---|---|
| Micrococcus cerificans | 14987 |
| Pseudomonas ligustri | 15522 |
| Pseudomonas pseudomallei | 15523 |
| Pseudomonas orvilla | 15524 |
| Alcaligenes sp. | 15525 |
| Cellumonas galba | 15526 |
| Brevibacterium insectiphilium | 15528 |
| Corynebacterium sp. | 15529 |
| Corynebacterium pourometabolum | 15530 |

It is also to be understood that the particular class and subclass of bacteria utilized is determined by the particular feed employed. For example, when the microorganisms are grown on methane or other gaseous paraffin feeds, the preferred class of microorganism is Pseudomonadaceae, such as *Pseudomonas methanica*. When the biosynthesis is performed using a light naphtha feed, the preferred classes of microorganisms are Pseudomonadaceae and Arthrobacter, such as *Pseudomonas fluorescens, Pseudomonas desmolyticum, Pseudomonas aeruginosa* and *Arthrobacter globiforme*.

The present invention is particularly concerned with a technique for biologically synthesizing food protein by cultivating microorganisms on petroleum substrates. This latter type of protein synthesis is usually conducted in an aqueous biosynthesis bath containing a hydrocarbon feed, an inoculant of the microorganism to be grown, an aqueous growth medium, oxygen and other indispensable nutrients. This technique allows the use of hydrocarbon feeds, which are less expensive than carbohydrates, and does not usually require expensive growth factors such as vitamins, amino acids, etc. in order to insure proper microorganism cell growth.

Hydrocarbon feeds which can be utilized for the present process are $C_{10}$–$C_{30}$ petroleum hydrocarbon feeds, preferably gas oils boiling in the range of between about 190° C. and about 400° C., preferably between about 190° C. and about 320° C. Other suitable feeds are $C_{10}$–$C_{30}$ normal and isoparaffins, cycloparaffins, monoolefins, diolefins, aromatics and mixtures thereof. A preferred feed is one which contains a substantial weight percentage, e.g. 70+ weight percent, of normal (straight chain) paraffin hydrocarbons having from 10 to 30 carbon atoms. While the presence of branched, nonaromatic hydrocarbons in amounts of up to 30% by weight in the hydrocarbon feed can be tolerated, concentrations in excess of 10 weight percent of nonnormal, nonaromatic hydrocarbons are usually avoided since the preferred microorganism cells employed in the present process are selective preferentially to normal hydrocarbons, especially small n-paraffins. Therefore, the use of branched paraffins is preferably avoided.

A most preferred hydrocarbon feed is a $C_{10}$–$C_{30}$ feedstock which has been purified to reduce the level of aromatics, both polycyclic and monocyclic, to below 0.5 weight percent, preferably below 0.1 weight percent, more preferably below about 100 p.p.m.

Oxygen is supplied to the cultivation medium in any form capable of being assimilated readily by the inoculant microorganism. Oxygen-containing compounds can be used as long as they do not adversely affect microorganism cell growth and conversion of hydrocarbon feed to microorganism cells. Conveniently, oxygen is supplied as an oxygen-containing gas, e.g., air, which contains between about 19 and about 22 weight percent oxygen. While it is preferable to employ air, oxygen-enriched air having more than 22 weight percent oxygen can be used. In general, between about 0.1 and about 10, preferably between about 0.8 and about 2.5, volumes per minute of air are supplied to the reactor per volume of biosynthesis bath liquid present.

Nitrogen is essential to biological growth. The source of nitrogen can be any organic or inorganic nitrogen-containing compound which is capable of releasing nitrogen in a form suitable for metabolic utilization by the growing microorganism(s). In the organic category, the following compounds can be listed as exemplary nitrogen-containing compounds which can be used: proteins, acid-hydrolyzed proteins, enzyme-digested proteins, amino acid, yeast extract, asparagine, urea, etc. For reasons of economy, it is usually preferable to employ an inorganic compound such as ammonia, ammonium hydroxide, or salts thereof such as ammonium phosphate, ammonium citrate, ammonium sulfate, ammonium acid phosphate, etc. A very convenient and satisfactory method of supplying nitrogen is to employ ammonium hydroxide, ammonium phosphate or ammonium acid phosphate, which can be added as the salt per se or can be produced in situ in the aqueous fermentation media by bubbling ammonia gas or gaseous ammonia through the broth to which phosphoric acid was previously added, thereby forming ammonium acid phosphate. In this way the pH range of 5.0–8.5 is maintained and the requisite nitrogen is supplied. Ammonium hydroxide can be supplied to the biosynthesis bath in amounts of between about 0.08 and about 0.20, preferably between about 0.08 and about 0.20, preferably between about 0.1 and about 0.15, gram of nitrogen per gram of dried bacteria cells produced. This amounts to between about 0.01 and about 1.0 wt. percent, preferably between about 0.1 and about 0.15 wt. percent, nitrogen based on the total biosynthesis bath.

In addition to the energy and nitrogen sources, it is necessary to supply requisite amounts of selected mineral nutrients in the feed medium in order to insure proper microorganism growth and maximize selectivity, viz., the assimilation of hydrocarbons by microorganism cells. Thus, potassium, sodium, iron, magnesium, calcium, manganese, phosphorous, and other nutrients are included in the aqueous growth medium. These necessary materials can be supplied in the form of their salts, and preferably their water-soluble salts. For example, the potassium can be supplied as potassium chloride, phosphate, sulfate, citrate, acetate, nitrate, etc. Iron and phosphorus can be supplied in the form of sulfates and phosphates, respectively, e.g., iron sulfate, iron phosphate. Usually, most of the phosphorus is supplied as ammonium phosphates. When either ammonium phosphate or ammonium acid phosphate is used, it can serve as a combined source of both nitrogen and phosphorus (phosphate ion) for microorganism cell growth. Generally, the compositional content of the fermentation growth media at the outset of fermentation is as follows:

| Component | Concentration (grams per liter) | | |
|---|---|---|---|
| | Can use | Usually Use | Preferably Use |
| $C_{11}$–$C_{30}$ n-aliphatic hydrocarbon | 4–120 | 5–80 | 10–50 |
| $K_2HPO_4$ | 0.5–15 | 1–10 | 2–8 |
| $(NH_4)_2HPO_4$ | 5–15 | 7–13 | 8–12 |
| $Na_2SO_4$ | 0.1–1.0 | 0.2–0.9 | 0.3–0.8 |
| $FeSO_4 \cdot 7H_2O$ | 0.002–0.05 | 0.005–0.04 | 0.01–0.03 |
| $MgSO_4 \cdot 7H_2O$ | 0.1–0.7 | 0.2–0.6 | 0.3–0.5 |
| $MnSO_4 \cdot 4H_2O$ | 0.002–0.05 | 0.005–0.04 | 0.01–0.03 |
| $NaCl$ | 0.002–0.05 | 0.005–0.04 | 0.01–0.03 |
| Water | Remainder to equal 100 weight percent | | |

Other optional mineral nutrients which can be included in trace amounts include:

| Component | Concentration (grams per liter) | | |
|---|---|---|---|
| | Can use | Usually Use | Preferably Use |
| $ZnSO_4 \cdot H_2O$ | 0–0.4 | 0–0.3 | 0–0.2 |
| $Na_2MoO_4 \cdot 2H_2O$ | 0–0.06 | 0–0.05 | 0–0.04 |
| $CoCl_2$ | 0–1.2 | 0–1.1 | 0–1.2 |
| $H_3BO_3$ | 0–0.08 | 0–0.07 | 0–0.06 |
| $CuSO_4 \cdot 5H_2O$ | 0–0.3 | 0–1.25 | 0–0.2 |
| $CaCl_2 \cdot 6H_2O$ | 0–0.14 | 0–0.13 | 0–0.12 |
| $NiCl_2 \cdot 6H_2O$ | 0–0.01 | 0–0.008 | 0–0.006 |

Of course, essential and optional nutrients can be supplied in the form of other salts than those tabulated hereinabove in amounts stoichiometrically the same (by calculation).

The temperature of the biosynthesis bath can be varied between about 20° C. and about 55° C. depending upon the specific microorganism being grown; but usually temperatures of between about 20° C. and about 45° C. are employed. Preferably the fermentation is conducted at temperatures ranging between about 25° C. and about 40° C.

As pointed out heretofore, unexpected, desirable results are secured by the use of an antibiotic in the fermentation process in that the protein produced is a much higher quality and much higher in the essential amino acids.

The present invention may be more readily understood by the following example illustrating the same.

Example 1

Arthrobacter species was treated in the presence of 250 gamma/100 ml. of media of Streptomycin and Streptomycin plus Trichloroacetic acid treated Pharmamedia under standard conditions. This concentration of antibiotic had no effect on the growth of Arthrobacter species as shown in Table I:

TABLE I

| | Arthrobacter Species | | TCA Treated Pharmamedia [1][2] | | Streptomycin +Pharmamedia | Streptomycin |
|---|---|---|---|---|---|---|
| | Control | +Pharmamedia (0.01%)[3] | +Streptomycin Solids | +Streptomycin Liquids | | |
| g./l. Cells | 11.33 | 11.82 | 11.04 | 12.05 | 11.96 | 11.54 |

[1] Traders Protein Div., Fort Worth, Tex., U.S.A.
[2] Trichloro acetic acid treatment was used to precipitate the protein from Pharmamedia. This was done to determine if the small amount of precipitated protein could be used to influence the metabolism of the organism, i.e. increasing its essential amino acid pools.
[3] 0.01 gms. of Pharmamedia was treated with 1.0 cc. of 10% trichloro acetic acid solution. The precipitated protein is designated as liquid and the insoluble fraction of the Pharmamedia is designated as solids.

TABLE II

| N/16 Basis | Control | Pharmamedia | TCA Treated Pharmamedia | | Streptomycin +Pharmamedia | Streptomycin |
|---|---|---|---|---|---|---|
| | | | Streptomycin +Solids | Streptomycin +Liquid | | |
| Percent S. Amino Acids | 1.84 | 1.99 | 2.36 | 2.22 | 2.87 | 2.96 |
| Percent Lysine | 4.6 | 4.8 | 4.8 | 5.3 | 5.6 | 6.4 |

Pharmamedia [1] is a low cost, finely ground yellow powder made from the embryo of the cottonseed. The principal component of Pharmamedia is a nonhydrolyzed globular protein. The protein content ranges from 55% to 60% depending on the grade of the current year's cottonseed. Pharmamedia's natural protein is of excellent quality due to Traders' special oil extraction process. Following are the typical constituents and composition of Pharmamedia.

| Analysis (typical): | Percent |
|---|---|
| Total solids | 97.89 |
| Protein (N x 6.25) | 59.62 |
|     Amino nitrogen | 5.74 |
|     Ammonia nitrogen | 2.97 |
| Fat | 4.55 |
| Sugar | 21.3 |
|     Galactose (percent of total sugar) | 33.0 |
|     Glucose (percent of total sugar) | 26.0 |
|     Arabinose (percent of total sugar) | 24.0 |
|     Xylose (percent of total sugar) | 6.0 |
|     Mannose+ribose+rhamnose | 11.0 |
| Ash | 6.85 |
| Fiber | 2.29 |
| Moisture | 2.11 |
| Gossypol | .041 |
| P.N. (aqueous solution) | 6.1 |
| Solubles: | |
|     Total solubles | 32.56 |
|     Soluble amino nitrogen | 1.65 |
|     Soluble phosphorus | .52 |
|     Soluble iron | .0015 |
|     Soluble magnesium | .363 |

All values determined relative to 1 gram of Pharmamedia which was autoclaved in 100 ml. of water for 15 min. at 120° C.

| Amino acids: | Percent |
|---|---|
| Lysine | 4.49 |
| Histidine | 2.96 |
| Arginine | 12.28 |
| Tryptophan | .95 |
| Aspartic acid | 9.66 |
| Threonine | 3.31 |
| Serine | 4.58 |
| Glutamic acid | 21.77 |
| Proline | 3.94 |
| Glycine | 3.78 |
| Alanine | 3.88 |
| ½ Cystine | 1.52 |
| Baline | 4.57 |
| Methionine | 1.52 |
| Isoleucine | 3.29 |
| Leucine | 6.11 |
| Tyrosine | 3.42 |
| Phenylalanine | 5.92 |

Calculated on 100% protein basis, Moore-Stein Technique.

| Minerals: | P.p.m. |
|---|---|
| Calcium (Ca) | 1,780 |
| Chlorides (Cl) | 920 |
| Phosphorus (P) | 12,200 |
| Iron (Fe) | 96 |
| Sulfates (SO$_4$) | 1,250 |
| Magnesium (Mg) | 6,800 |
| Potassium (K) | 13,000 |
| Sodium (Na) | 275 |

| Vitamins: | μg./Gm. |
|---|---|
| Carotene | .37 |
| Total tochopherols | 18.1 |
| Ascorbic acid | 45.6 |
| Thiamine | 15.6 |
| Riboflavin | 10.8 |
| Niacin | 59.7 |
| Pantothenic acid | 43.2 |
| Choline | 3240. |
| Pyridoxine | 11.9 |
| Biotin | .51 |
| Folic acid | .96 |
| Inositol | 10800. |

Furthermore, by technique of the present invention the total essential amino acid concentration was increased above the 1957 Food Agricultural Organization Standard (1926 mg./g. of N). (This figure has tryptophan deducted since tryptophan was not obtained.) The balance of the protein was improved from 54% as good as hen's egg to 70%.

When a comparison is made of the essential amino acid concentration of treated samples with Arthrobacter species control, FAO standard and hen's egg, it is evident there results a marked improvement.

TABLE III

| | Mg. of essential amino acid/g. of N** |
|---|---|
| Hen's egg | 3115 |
| FAO standard | 1926 |
| Arthrobacter species control | 1683.8 |
| Arthrobacter+Pharmamedia | 1671.3 |
| Arthrobacter+Streptomycin TCA treated solids | 1637.5 |
| Arthrobacter+Streptomycin TCA treated liquid | 1782.5 |
| Arthrobacter+Pharmamedia+Streptomycin | 1950.0 |
| Streptomycin+Arthrobacter | 2183.8 |

**Tryptophan backed out.

The protein scores [2] which were done on several critical essential amino acids showed that the balance was much better and that it improved the S amino acid score from 61.5% to 86.7%. In addition, the phenylalanine+Tyrosine may then become the limiting rather than the S amino acids.

Further analyses were made which proved that no distortion or imbalance resulted with respect to other amino acids as shown by the following table.

TABLE IV.—STREPTOMYCIN

| Amino Acid Analysis: | N/16 Basis | | | | | |
|---|---|---|---|---|---|---|
| Alanine | 6.0 | 5.9 | 5.5 | 6.0 | 6.8 | 7.8 |
| Allo-isoleucine | 0 | 0 | 0 | 0 | 0 | 0 |
| Arginine | 3.7 | 3.8 | 3.6 | 4.0 | 4.3 | 4.7 |
| Aspartic Acid | 7.2 | 7.3 | 7.0 | 7.6 | 8.5 | 9.6 |
| Cysteic Acid | 0.1 | 0.1 | 0.1 | 0.2 | 0.1 | 0.1 |
| Cystine | 0.4 | 0.4 | 0.9 | 0.5 | 1.1 | 1.0 |
| Glutamic Acid | 8.9 | 8.8 | 8.4 | 8.7 | 9.7 | 11.6 |
| Glycine | 3.5 | 3.3 | 3.1 | 3.2 | 3.8 | 4.2 |
| Histidine | 2.2 | 2.5 | 2.4 | 2.4 | 2.8 | 3.2 |
| Isoleucine | 3.3 | 3.4 | 3.1 | 4.0 | 3.8 | 4.4 |
| Leucine | 5.0 | 5.0 | 4.6 | 5.1 | 5.3 | 6.2 |
| Lysine | 4.6 | 4.8 | 4.3 | 5.3 | 5.6 | 6.4 |
| Methionine | 1.2 | 1.2 | 0.5 | 1.1 | 1.5 | 1.6 |
| Methionine Sulfoxide | 0.1 | 0.3 | 1.0 | 0.4 | 0.3 | 0.3 |
| Ornithine | 0 | 0 | 0 | 0 | 0 | 0 |
| Phenylalanine | 2.5 | 2.6 | .25 | 2.7 | 2.9 | 3.3 |
| Proline | 2.2 | 2.2 | 2.3 | 2.4 | 2.8 | 3.3 |
| Serine | 2.9 | 2.8 | 2.7 | 2.8 | 3.2 | 3.6 |
| Treonine | 3.7 | 3.3 | 3.3 | 3.3 | 3.9 | 4.3 |
| Tyrosine | 2.3 | 2.3 | 2.2 | 2.5 | 2.5 | 3.0 |
| Valine | 3.7 | 3.3 | 3.2 | 3.4 | 4.2 | 4.3 |
| Total S Amino Acids | 1.84 | 1.99 | 2.36 | 2.22 | 2.87 | 2.96 |
| Total Protein (N x 6.25) | 61.70 | 41.88 | 44.31 | 45.81 | 53.00 | 42.00 |
| Fermentation Conditions: | | | | | | |
| Organism | Arthrobacter species | | | | | |
| Medium | P$^1$ | P$^1$ | P$^1$ | P$^1$ | P$^1$ | P$^1$ |
| HC, 2.0 cc | C$^{16}$ | C$^{16}$ | C$^{16}$ | C$^{16}$ | C$^{16}$ | C$^{16}$ |
| Pharmamedia, gms | 0 | 0.01 | 0.01 | 0.01 | 0.01 | 0 |
| Treated Pharmamedia | 0 | 0 | (¹) | (²) | 0 | 0 |
| Streptomycin, mg | 0 | 0 | 250 | 250 | 250 | 250 |
| Fermentation Time (hrs.) | 42 | 42 | 42 | 42 | 42 | 42 |
| Cell Wt., g./l | 11.33 | 11.82 | 11.04 | 12.05 | 11.96 | 11.54 |

[1] Traders Protein Div., Fort Worth, Tex., U.S.A.
[2] Calculated as illustrated on page 69 of the World Health Organization Technical Report Series No. 301, Geneva, 1965.

TABLE IV—Continued

| Amino Acid Analysis: | Milligrams A.A./Gms. N | | | | | |
|---|---|---|---|---|---|---|
| Alanine | 375.00 | 368.75 | 343.75 | 375.00 | 425.00 | 487.50 |
| Allo-isoleucine | 0 | 0 | 0 | 0 | 0 | 0 |
| Arginine | 231.25 | 237.50 | 225.00 | 250.00 | 268.75 | 293.75 |
| Aspartic Acid | 450.00 | 456.25 | 437.50 | 475.00 | 531.25 | 600.00 |
| Cysteic Acid | 6.25 | 6.25 | 6.25 | 12.50 | 6.25 | 6.25 |
| Cystine | 25.00 | 25.00 | 56.25 | 31.25 | 68.75 | 62.50 |
| Glutamic Acid | 556.25 | 537.50 | 525.00 | 543.75 | 606.25 | 725.00 |
| Glycine | 218.75 | 206.25 | 193.75 | 200.00 | 237.50 | 262.50 |
| Histidine | 137.50 | 156.25 | 150.00 | 150.00 | 175.00 | 200.00 |
| Isoleucine | 206.25 | 212.50 | 193.75 | 250.00 | 237.50 | 275.00 |
| Leucine | 312.50 | 312.50 | 287.50 | 318.75 | 331.25 | 387.50 |
| Lysine | 287.50 | 300.00 | 300.00 | 331.25 | 350.00 | 400.00 |
| Methionine | 75.00 | 75.00 | 31.25 | 68.75 | 93.75 | 100.00 |
| Methionine Sulfoxide | 8.75 | 21.25 | 62.50 | 26.25 | 18.75 | 21.25 |
| Ornithine | 0 | 0 | 0 | 0 | 0 | 0 |
| Phenylalanine | 156.25 | 162.50 | 156.25 | 168.75 | 181.25 | 206.25 |
| Proline | 137.50 | 137.50 | 143.75 | 150.00 | 175.00 | 206.25 |
| Serine | 181.25 | 175.00 | 168.75 | 175.00 | 200.00 | 225.00 |
| Threonine | 231.25 | 206.25 | 206.25 | 206.25 | 243.75 | 268.75 |
| Tyrosine | 143.75 | 143.75 | 137.50 | 156.25 | 156.25 | 187.50 |
| Valine | 231.25 | 206.25 | 200.00 | 212.50 | 262.50 | 268.75 |

[1] Solids. [2] Liquids.

The following Table V shows a marked increase in the total essential amino acid content was obtained using Streptomycin, Streptomycin+Pharmamedia and Streptomycin plus liquid. In addition, the S amino acid content has been limiting in the (Arthrobacter species) protein and with this technique it is possible to more than double the Cystine content and increase by 30% the Methionine content. Every essential amino acid was markedly increased in the protein which makes the protein much better as a nutritional source.

TABLE V.—ARTHROBACTER SPECIES

| Amino Acids | Control, mg. of A.A./g./N | Pharmamedia | TCA-Treated Pharmamedia | | Pharmamedia + Streptomycin | Streptomycin |
|---|---|---|---|---|---|---|
| | | | Streptomycin + Solids | Streptomycin + Liquid | | |
| Isoleucine | 206.25 | 212.50 | 193.75 | 250.00 | 237.50 | 275.00 |
| Leucine | 312.50 | 312.50 | 287.50 | 318.75 | 331.25 | 387.50 |
| Lysine | 287.50 | 300.00 | 300.00 | 331.25 | 350.00 | 400.00 |
| Phenylalanine | 156.25 | 162.50 | 156.25 | 168.75 | 181.25 | 206.25 |
| Tyrosine | 143.75 | 143.75 | 137.50 | 156.25 | 156.25 | 187.50 |
| Cystine | 31.25 | 31.25 | 62.50 | 43.75 | 75.00 | 68.75 |
| Methionine | 83.75 | 96.25 | 93.75 | 95.00 | 112.50 | 121.25 |
| Threonine | 231.25 | 206.25 | 206.25 | 206.25 | 243.75 | 268.75 |
| Valine | 231.25 | 206.25 | 200.00 | 212.50 | 262.50 | 268.75 |
| Total Essential Amino Acids | 1,683.75 | 1,671.25 | 1,637.50 | 1,782.50 | 1,950.00 | 2,183.75 |

It is well known by nutritionists that a protein, just because it is high in one particular amino acid, may not be well balanced. In other words, if all the essential amino acids but one make up only 20% of the essentials and one makes up 80%, there will exist feedback inhibitions. That is why, if the essential amino acid concentrations are increased, it is necessary to keep a balance. The present process keeps a balance and increases the percent of S amino acids as shown in Table VI which will improve the protein.

TABLE VI.—COMPARISON OF INDIVIDUAL AMINO ACIDS/TOTAL ESSENTIAL AMINO ACIDS

| | #1 | #2 | #3 | #4 | #5 | #6 |
|---|---|---|---|---|---|---|
| Sulfur A.A. (mg./g. of N) | 115.00 | 127.50 | 156.25 | 138.75 | 187.50 | 190.0 |
| Percent of Essential Amino Acid | 6.83 | 7.63 | 9.54 | 7.78 | 9.62 | 8.7 |
| Lysine (mg./g. of N) | 287.50 | 300.00 | 300.00 | 331.25 | 350.00 | 400.00 |
| Percent of Essential Amino Acid | 17.07 | 17.95 | 18.32 | 18.58 | 17.94 | 18.32 |
| Threonine | 231.25 | 206.25 | 206.25 | 206.25 | 243.75 | 268.75 |
| Percent of Essential Amino Acid | 13.73 | 12.34 | 12.60 | 11.57 | 12.50 | 12.31 |
| Phenylalanine +Tyrosine | 300.00 | 306.25 | 293.75 | 325.00 | 337.50 | 393.75 |
| Percent of Essential Amino Acid | 17.82 | 18.32 | 17.94 | 18.23 | 17.31 | 18.03 |

Nutritionists use hen's eggs as a standard and all proteins are compared with the standard to see if the protein is properly balanced by fulfilling man's individual amino acid requirements. Table VII shows that as high as 87% of the S amino acid requirements are secured. The entire protein produced after Streptomycin treatment is a far better balanced protein than the initial Arthrobacter protein.

TABLE VII.—PROTEIN SCORE
[Percent essential amino acid compared with reference percent]

| | Sulfur A.A. | Lysine | Threonine | Phenylalanine + Tyrosine |
|---|---|---|---|---|
| Hen's Egg: | | | | |
| #1 (Control) | 61.48 | 131.92 | 134.87 | 88.52 |
| #2 (Pharmamedia) | 68.68 | 138.72 | 121.22 | 91.01 |
| #3 (Streptomycin + Solids) | 85.95 | 141.58 | 123.77 | 89.12 |
| #4 (Streptomycin + Liquid) | 70.09 | 143.59 | 113.65 | 90.56 |
| #5 (Pharmamedia + Streptomycin) | 86.67 | 138.64 | 122.79 | 85.99 |
| #6 (Streptomycin) | 78.38 | 141.58 | 120.92 | 89.57 |
| FAO: | | | | |
| #1 (Control) | 48.72 | 121.75 | 146.84 | 95.35 |
| #2 (Pharmamedia) | 54.42 | 128.03 | 131.98 | 98.02 |
| #3 (Streptomycin + Solids) | 68.05 | 130.67 | 134.76 | 95.99 |
| #4 (Streptomycin + Liquid) | 55.49 | 132.52 | 123.74 | 97.54 |
| #5 (Pharmamedia + Streptomycin) | 68.62 | 127.96 | 133.69 | 92.62 |
| #6 (Streptomycin) | 62.05 | 130.67 | 131.66 | 96.47 |

Thus, the present invention is concerned with the use of an antibiotic such as streptomycin in a fermentation process. Other suitable antibiotics are, for example, polymycin neomycin, chloromycetin, Vancomycin, Coly-Mycin, penicillin.

The concentration of the antibiotic used may vary appreciably depending upon operating conditions. The concentration may range from about 10 to 6000 gamma/100 ml. of media. A preferred range is from about 100 to 500 gamma/100 ml. of media, such as about 250 gamma/100 ml. of media. The time period likewise may vary appreciably as, for example, from about 24 to 72 hours as, for example, about 42 hours. The concentration of the hydrocarbon in the media is from about 0.1 to 10% by volume, preferably in the range of from about 1 to 2% by volume.

What is claimed is:

1. In a fermentation process for the preparation of a high protein-content product utilizing a $C_1$-$C_{35}$ hydrocarbon feed, an aqueous inorganic salt growth medium, an oxygen-containing gas, a bacteria capable of growth on said hydrocarbon, the improvement comprising increasing the concentration of essential amino acids in nutritionally balanced proportions by the incorporation of streptomycin in the hydrocarbon medium.

2. Process as defined by claim 1 wherein the concentration of the streptomycin is in the range of about 10 to 6,000 gamma/100 ml. of media.

3. Process as defined by claim 2 wherein the concentration of the streptomycin is in the range of from about 100 to 500 gamma/100 ml. of media.

4. Process as defined by the preceding claim 3 wherein the feed comprises a $C_{10}$-$C_{30}$ hydrocarbon, wherein the temperature in the fermentation process is in the range of from about 20° C. to about 55° C.

References Cited

UNITED STATES PATENTS 3,222,258   12/1965   Iizuka et al. _____ 195—29

OTHER REFERENCES

Iguchi et al., "L-Glutamate Formation from Hydrocarbons by Microorganisms," Agr. Biol. Chem., vol. 29, pp. 589–590, 1965.

LIONEL M. SHAPIRO, *Primary Examiner.*

N. ROSKIN, *Assistant Examiner.*